INVENTOR.
TONY P. GENNOCRO
BY Donald R. Castle
ATTORNEY

United States Patent Office 3,598,555
Patented Aug. 10, 1971

3,598,555
METHOD OF SEALING A METALLIC ELEMENT INTO GLASS HAVING A HIGH PERCENTAGE OF LEAD
Tony P. Gennocro, Emporium, Pa., assignor to Sylvania Electric Products Inc.
Filed May 1, 1970, Ser. No. 33,818
Int. Cl. C03c 27/02; C03b 23/04
U.S. Cl. 65—55                 4 Claims

ABSTRACT OF THE DISCLOSURE

A method of sealing a metallic element into a seal area of a tubular glass envelope containing a high percentage of lead wherein the envelope is fixed on a mandrel and the metallic element is mounted on the mandrel. The envelope is rotated and its interior surface at the seal area is heated to a workable temperature. The exterior surface at the seal area is then heated and the seal area is shaped by a roller into a dome having a central aperture. The metallic element is then forcibly inserted into the aperture while the heating and rotating are continued.

BACKGROUND OF THE INVENTION

This invention relates to glass to metal sealing and more particularly to a method of sealing, without glass wrinkles, a high lead glass to a metallic electrode, such as an anode for a receiving tube. It is still more directly related to a method of making the anode seal in tubes designed to operate at high voltages.

Tubes which operate at high voltages, such as shunt regulator tubes and high voltage rectifiers used in color television receivers, are known to be capable of emitting X-radiation under certain operating conditions. This X-radiation has become a source of concern because of possibly harmful effects from long exposure thereto. To shield from these effects, the receiving tube industry has attempted to utilize a high lead content glass for the envelope; i.e., a glass comprising from 45% to 60% lead. A glass of this nature adequately prevents or reduces X-radiation from the tube.

Problems, however, have arisen from use of this type of material, primarily in the seal area of the anode. It is to be noted that tubes of the above-described types generally have the top of the anode, generally called the top cap, sealed into an end of the tube opposite the step leads. The top cap protrudes from the glass and electrical connection is made directly thereto by a clip or other suitable connector.

In the past the anode was assembled and sealed into the glass by mounting the anode on a mandrel and centering thereover a piece of tubular glass which will form the envelope. The glass and anode were rotated about their longitudinal axis while flames played on the outside surface of the upper portion of the glass where the seal was to be made until the glass reached a workable temperature. Then a roller contacted the glass and applied pressure to form the heated seal area inwardly into a dome. Before the dome sealed completely the anode was raised through the top and heat was applied until a seal was effected.

While this form of construction and method have been in use for many years (see U.S. Pat. No. 2,923,096 assigned to the assignee of the present invention) it proved substantially unworkable with the high lead glass. When this latter material was employed wrinkles appeared in the glass which disturbed the seal and caused failure of the tube.

OBJECTS AND SUMMARY OF THE INVENTION

Therefore, it is an object of this invention to obviate the disadvantages of the prior art.

It is another object of the invention to provide wrinkle free seals in tubes of the class described using high lead glass.

These objects are accomplished in one aspect of the invention by the provision of a method for sealing metallic elements into high lead glass tubes which comprises bringing the seal area to a working temperature by initially heating the inner surface of the tube rather than the outer surface and then forming the heated end into a dome and inserting the element. Utilization of this method adequately prevents the afore-mentioned wrinkles and greatly improves tube life and performance of the tube.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
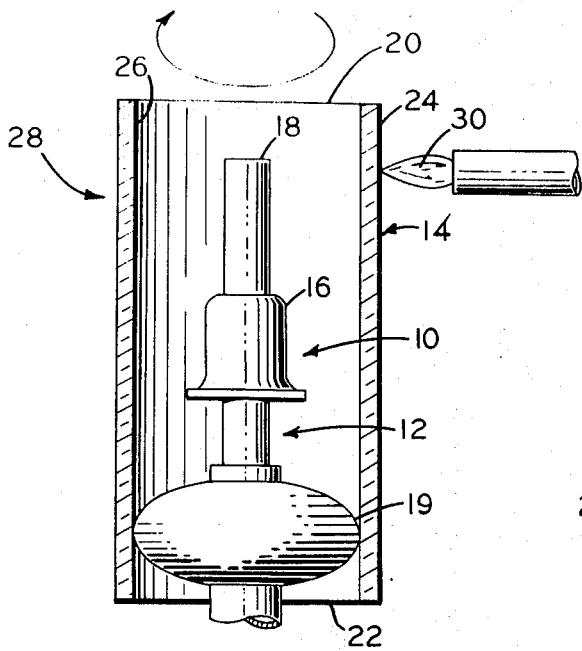
FIG. 1 is a diagrammatic view illustrating the method of the prior art.

Referring now to the drawings with greater particularity, there is shown in FIG. 1 an illustration of a prior art method of heating the seal area. Herein, a metallic element 10, which can be the anode of a receiving tube is mounted on a mandrel 12. Longitudinally positioned thereabout is a tubular section of glass 14 which will form the envelope of the finished receiving tube. The mandrel 12 and glass 14 are together rotated about their coincident longitudinal axis. The metallic element 10, which in this instance is an anode, comprises a more or less bell-shaped portion 16 and a cylindrical top cap 18. It is the top cap 18 which is sealed into the glass and this portion has a given diameter. The mandrel 12 and anode 10 are centered in the glass by means of a resilient bag 19. Details of this mounting arrangement can be found in U.S. Pat. 2,923,096 and will not be further described herein.

The tubular glass section 14 has open ends 20 and 22 with a given diameter, which is larger than the diameter of the top cap, and outer and inner surfaces 24 and 26 respectively. The upper portion of the glass is generally designated as seal area 28. A suitable flame 30 is played on outer surface 24 at this seal area 28 until the glass reaches a workable temperature at which time the heated glass is domed inwardly toward the top cap 18 and the seal therebetween is effected. When this prior art technique is utilized with high lead glass, i.e., glass containing from about 45% to 60% lead, the seal area is adversely effected by wrinkles in the glass. These wrinkles cause an imperfect hermetic seal and cause the assembly to be rejected. The exact reason for this is unknown, since the procedure works well with glass having low amounts of lead or no lead at all. It seems apparent that the high lead glass has somewhat different heating and flow characteristics and that this contributes to the wrinkles.

Figure 2:
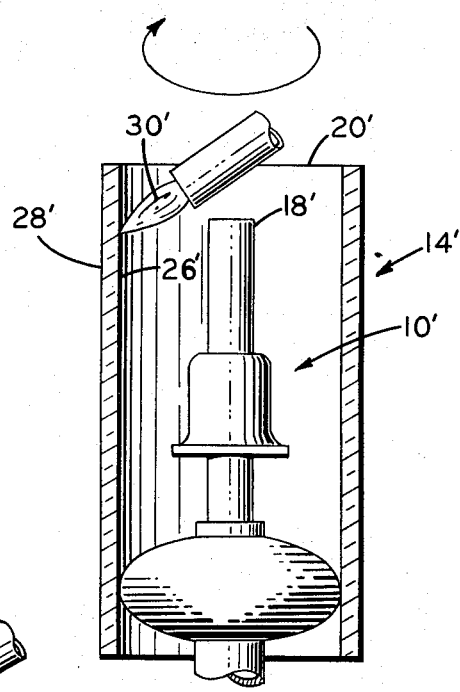
FIG. 2 is a similar view illustrating the method of the invention.
Figure 3:
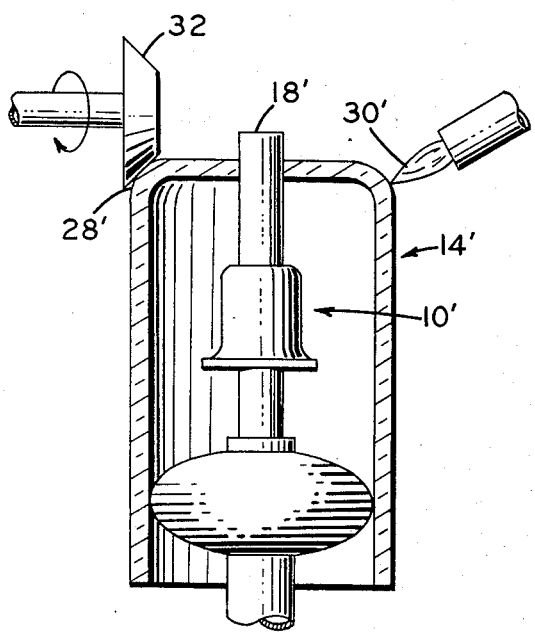
FIG. 3 is an illustration of the dome forming operation.

To eliminate this problem, the method of this invention was devised and is illustrated in FIGS. 2 and 3. Herein, the flame 30' is played on the inner surface 26' of the glass section 14'. The anode 10' is mounted as described above. The anode and glass are rotated and the flame applied until the glass of the seal area 28' reaches a workable temperature. For various types of high lead glass currently being used or considered, this temperature will be in the range of about 600° C. to 1000° C. Such glasses can be for example, GE–819, available from the General Electric Company or EG–14, available from the Kimble Glass Company. The type GE–819 is 49% lead and has a softening point at approximately 605° C. and a working point at approximately 855° C. while the type EG–14 contains 50% lead and has a similar softening point and a working point.

After the glass has reached a workable temperature, the flame is withdrawn from the inner surface 26' and applied to the outer surface 24'. Then the seal area 28' is contacted by a roller 32 (FIG. 3) which bears against the seal area 28' to shape the top of the glass into a dome. When by this action the hole in open end 20' has been almost wholly closed, the anode 10' is raised, by means not shown, and the top cap 18' forces aside the glass of the dome forming the walls of the hole and moves into the hole. Further heating completes the seal.

This initial heating of the inner surface of the seal area eliminates the unwanted wrinkles in the glass and forms an adequate hermetic seal.

While there has been shown and described what are at present considered the preferred embodiments of the invention, it will be obvious to those skilled in the art that various changes and modifications may be made therein without departing from the scope of the invention as defined by the appended claims.

I claim:

1. In a method of sealing a metallic element having a given diameter into a seal area formed at one end of a tubular glass envelope containing a high percentage of lead and having a given inner diameter, the steps comprising: fixing said envelope on a mandrel for rotation about its longitudinal axis; mounting the metallic element on said mandrel; rotating said envelope about said axis; playing a suitable flame on the interior surface of said envelope at said seal area until said seal area reaches a workable temperature; removing said flame from said inner surface and playing said flame on the outer surface; contacting said heated seal area with a roller to shape said seal area into a dome having a centrally located aperture with a diameter smaller than said given diameter of said envelope and smaller than the given diameter of said metallic element; and inserting said element in said aperture by forcing aside the glass of said dome and continuing to apply heat and rotation until a seal is effected.

2. The invention of claim 1 wherein said percentage of lead is between about 45 to 60.

3. The invention of claim 1 wherein said workable temperature is between about 600° C. and 1000° C.

4. The invention of claim 1 wherein said metallic element is a cylindrical anode connector.

References Cited

UNITED STATES PATENTS 2,923,096 2/1960 Larson _____ 29—25.19
3,490,886 1/1970 Stoll _____ 65—59X S. LEON BASHORE, Primary Examiner S. R. FRIEDMAN, Assistant Examiner U.S. Cl. X.R.

65—57, 59